(12) United States Patent
Cai et al.

(10) Patent No.: US 7,496,113 B2
(45) Date of Patent: Feb. 24, 2009

(54) FAST CELL SEARCH AND ACCURATE SYNCHRONIZATION IN WIRELESS COMMUNICATIONS

(75) Inventors: Sean Cai, San Diego, CA (US); Wenzhong Zhang, San Diego, CA (US); Jing Wang, San Diego, CA (US); Jason Hou, Carlsbad, CA (US); Yonggang Fang, San Diego, CA (US); Yunsong Yang, San Diego, CA (US)

(73) Assignee: ZTE (USA) Inc., Iselin, NJ (US)

( * ) Notice: Subject to any disclaimer, the term of this patent is extended or adjusted under 35 U.S.C. 154(b) by 786 days.

(21) Appl. No.: 11/205,774

(22) Filed: Aug. 16, 2005

(65) Prior Publication Data

US 2006/0062196 A1    Mar. 23, 2006

Related U.S. Application Data

(60) Provisional application No. 60/601,790, filed on Aug. 16, 2004.

(51) Int. Cl.
*H04J 3/06* (2006.01)

(52) U.S. Cl. .................... 370/474; 455/450; 370/475; 370/476; 370/514

(58) Field of Classification Search ......... 370/203–208, 370/310–350, 432, 474–476, 478, 498, 508–528; 455/450
See application file for complete search history.

(56) References Cited

U.S. PATENT DOCUMENTS

| | | | |
|---|---|---|---|
| 5,251,233 A | 10/1993 | Labedz et al. | |
| 6,141,335 A | 10/2000 | Kuwahara et al. | |
| 6,205,132 B1 | 3/2001 | Hong et al. | |
| 6,226,315 B1 | 5/2001 | Sriram et al. | |
| 6,289,007 B1 | 9/2001 | Kim et al. | |
| 6,473,619 B1 | 10/2002 | Kong et al. | |
| 6,553,011 B1 | 4/2003 | Yan et al. | |
| 6,628,634 B2 | 9/2003 | Palenius | |
| 2003/0072255 A1* | 4/2003 | Ma et al. | 370/208 |
| 2004/0136464 A1 | 7/2004 | Suh et al. | |
| 2005/0058058 A1* | 3/2005 | Cho et al. | 370/208 |
| 2005/0084035 A1 | 4/2005 | Kim et al. | |
| 2006/0029017 A1* | 2/2006 | Mudulodu et al. | 370/328 |
| 2008/0039107 A1* | 2/2008 | Ma et al. | 455/450 |

OTHER PUBLICATIONS

Zhang, Zhao-Yang, et al., A Novel OFDM Transmission Scheme with Length-Adaptive Cyclic Prefix, J Zhejiang Uni Sci. 2004 No. 5(11):1336-42.

* cited by examiner

*Primary Examiner*—Seema S Rao
*Assistant Examiner*—Wanda Z Russell
(74) *Attorney, Agent, or Firm*—Fish & Richardson P.C.

(57) ABSTRACT

Techniques for fast cell search, selection and reselection for wireless communication systems such as OFDM or OFDMA communication systems. In various implementations of the described techniques, downlink subframes from base stations to mobile stations are designed to include information in form of preambles or post-ambles in one or more downlink subframes to facilitate cell search at receiving mobile stations at high speeds. The described preambles and post-ambles may also be used to improve the accuracy of signal synchronization in time and frequency.

54 Claims, 10 Drawing Sheets

| | Sector 0 |
| | Sector 1 |
| | Sector 2 |

| Group SYNC ID | IDcell | Preamble PN Sequence # | | |
| --- | --- | --- | --- | --- |
| | | Segment 0 | Segment 1 | Segment 2 |
| 0 | 0, 8,16,24 | 0, 8,16,24, 96 | 32,40,48,56,112 | 64,72,80,88, 104 |
| 1 | 1,9,17,25 | 1,9,17,25, 105 | 33,41,49,57,97 | 65,73,81,89,113 |
| 2 | 2,10,18,26 | 2,10,18,26, | 34,42,50,58,106 | 66,74,82,90,98 |
| 3 | 3,11,19,27 | 3,11,19,27,99 | 35,43,51,59 | 67,75,83,91,107 |
| 4 | 4,12,20,28 | 4,12,20,28,108 | 36,44,52,60,100 | 68,76,84,92 |
| 5 | 5,13,21,29 | 5,13,21,29 | 37,45,53,61,109 | 69,77,85,93, 101 |
| 6 | 6,14,22,30 | 6,14,22,30,102 | 38,46,54,62 | 70,78,86,94,110 |
| 7 | 7,15,23,31 | 7,15,23,31,111 | 39,47,55,63,103 | 71,79,87,95 |

FAST CELL SEARCH AND ACCURATE SYNCHRONIZATION IN WIRELESS COMMUNICATIONS

CROSS REFERENCE TO RELATED APPLICATION

This application claims the benefit of provisional U.S. application Ser. No. 60/601,790, entitled "PREAMBLE SEQUENCES FOR FAST CELL SEARCH" and filed Aug. 16, 2004, which is incorporated herein by reference in its entirety as part of the specification of this application.

BACKGROUND

This application relates to cell search and signal synchronization in wireless communication systems including systems based on orthogonal frequency division multiplexing (OFDM) and orthogonal frequency division multiple access (OFDMA).

Wireless communication systems use a network of base stations to communicate with wireless devices registered for services in the systems. Each base station emits radio signal that carry data such as voice data and other data content to wireless devices. Such a signal from a base station can include overhead load other than data for various communication management functions, including information to allow a wireless device to identify a cell sector of a base station, to synchronize signaling in time and frequency. Each wireless device processes such information in the overhead load of reach received signal prior to processing of the data.

OFDM and OFDMA based communication systems are based on the orthogonality of frequencies of multiple subcarriers and can be implemented to achieve a number of technical advantages for wideband wireless communications, such as resistance to multipath fading and interference. However, many OFDM and OFDMA based wireless communication systems can be sensitive to frequency offsets and phase noise. In an OFDM or OFDMA based wireless communication system, the wireless service to a geographic area is provided by dividing the area into a plurality of cells, which can be further divided into two or more cell sectors. The base stations, which conceptually locate at the center of respective cells of their coverage, transmit information to a mobile subscriber station (MSS) via downlink (DL) radio signals sent out from the base stations. A mobile subscriber station is also known as a mobile station (MS) or the wireless station. The mobile stations transmit information to their serving base stations via uplink (UL) radio signals.

The downlink radio signals from the base stations to mobile stations may include voice or data traffic signals or both. In addition, the base stations generally need to transmit preamble signals in their downlink radio signals to identify to the mobile stations, the corresponding cells and corresponding segments in the cells from which the downlink radio signals are transmitted. Such a preamble signal from a base station allows a mobile station to synchronize its receiver in both time and frequency with the observed downlink signal and to acquire the identity, such as IDcell and Segment, of the base station that transmits the downlink signal.

IEEE 802.16 OFDMA has been developed to provide wireless communications based on an orthogonal frequency division multiple access (OFDMA) modulation technique. In the DL preambles currently defined in IEEE 802.16 OFDMA, the MSSs store predefined and handcrafted pseudo-noise (PN) like sequences for identifying IDcell numbers and segment numbers of the adjacent cells. In operation, an MSS captures the preamble symbols in received downlink signals and correlates the preamble in each received downlink signal with the stored pseudo-noise (PN) like sequences to determine IDcell and Segment of a specific sector for that received downlink signal. These preamble sequences are handcrafted in advance and are processed by the MSS one at a time. There are more than 100 such sequences (e.g., 114) in some implementations of the current IEEE 802.16 OFDMA. Performing the cross-correlation with such a large number of preamble sequences can be time consuming, and thus can adversely affect the quality of service to a mobile station, especially when the mobile station is rapidly moving.

FIG. 1 shows an example of the signal subframe format in the time domain for an OFDMA downlink signal in an OFDMA system. This subframe structure is defined in IEEE P802.16-REVd/D5-2004 standard and includes a number of sequential OFDM symbols 110, 120, 130, and 140. Each OFDM symbol has a cyclic prefix (CP) (112 or 142) and a fast Fourier transform (FFT) symbol (114 or 144) which is the inverse FFT (IFFT) of the payload sequence in frequency. The CP 112, 142 is a copy of the last portion 116, 146 of the FFT symbol 114, 144 that the CP 112, 142 is prefixed to. The CP 112, 114 is used to combat adverse multipath effects in a DL signal received at a mobile station.

In the illustrated example, the first OFDM symbol 110 in the downlink subframe contains a payload of the preamble in frequency. Each of the subsequent OFDM symbols 120, 130, and 140 contains a payload of data in frequency. The BS transmits the cell-specific preamble symbol 110 in each downlink subframe in order for the MSS receiver to synchronize with the received downlink signals in both time and frequency, and to perform cell search, cell selection, and cell reselection.

FIG. 2 illustrates an exemplary detection procedure in an MSS under IEEE P802.16-REVd/D5-2004. In this preamble detection scheme, the MSS receiver first performs time synchronization in step 202 by performing a CP correlation procedure. Once the time is synchronized, the CP 112 is removed and the FFT operation is performed in step 204 on the remaining time sequence that has a length of the FFT size in order to restore the payload sequence in frequency. In step 206, the output sequence of the FFT operation is correlated with each of all preset cell-specific preamble sequences in frequency, one sequence at a time. For example, in a system with 114 cell-specific preamble sequences, the correlation procedure is performed 114 times. Next in step 208, the MSS receiver determines whether the largest correlation output from step 206 is greater than a predetermined detection threshold. If the largest correlation output is greater than the threshold, the cell-specific preamble sequence corresponding to the largest correction output is identified and the associated BS is selected as the current serving BS. Next, the MSS receiver further processes the rest of the downlink subframe signal such as extracting the data in the data symbols. If the largest correlation output is not greater than the detection threshold, the MSS receiver moves on to the next received OFDM symbol and repeat the steps from step 202 to step 208 to search for a correlation output greater than the correlation threshold.

IEEE P802.16-REVd/D5-2004 has 114 unique preamble sequences to represent up to 114 combinations of BS cell sites and antenna segments. Table 1 below shows a portion of the 114 preamble sequences in frequency, with the associated cell identities (i.e. IDcell and Segment). Each preamble sequence is a handcrafted pseudo-noise (PN) sequence that has relatively good autocorrelation characteristics in the frequency domain and low peak to average power ratio (PAPR) in the time domain. However, it is time- and power-consuming to perform the correlation process for all 114 candidate preamble sequences. Also, because the CP is only a fraction of the FFT size, the CP based symbol timing detection method may not be sufficiently accurate and may introduce inter-symbol interference (ISI), thus degrading the performance of the cell search process that follows. Furthermore, the initial frequency estimation based on CP correlation can be coarse and thus may not be reliable. These technical limitations of the preamble design under IEEE P802.16-REVd/D5-2004 can lead to a long cell search time, which may not be acceptable in some communication applications, such as wireless mobile communication services.

TABLE 1

| Preamble Index | IDcell | Segment | Preamble Sequences (in Hexadecimal format) |
|---|---|---|---|
| 0 | 0 | 0 | A6F294537B285E1844677D133E4D53CCB1F182DE00489E53E6B6E77065C7EE7D0ADBEAF |
| 1 | 1 | 0 | 668321CBBE7F462E6C2A07E8BBDA2C7F7946D5F69E35AC8ACF7D64AB4A33C467001F3B2 |
| 2 | 2 | 0 | 1C75D30B2DF72CEC9117A0BD8EAF8E0502461FC07456AC906ADE03E9B5AB5E1D3F98C6E |
| . | . | . | . |
| . | . | . | . |
| . | . | . | . |
| 31 | 31 | 0 | 4841AFC277B86A0E067AF319422F501C87ACBFBDD66BFEA3644F879AE98BA8C5D605123 |
| 32 | 0 | 1 | F35EA87318E459138A2CE69169AD5FD9F30B62DA04ED21320A9F59893F0D176752152FD |
| 33 | 1 | 1 | A0C5F35C5971CD3DC55D7D2B9FD27AA17A198583F580EB0800744EE5B6B3648DEA95840 |
| 34 | 2 | 1 | A6D3D33AD9B56862DBF076E3ACE6A3150510CCC8BE77DE4E6E10EB5FE163765647D07DF |
| . | . | . | . |
| . | . | . | . |
| . | . | . | . |
| 95 | 31 | 2 | E7FDDCEED8D31B2C0752D976DE92BEA241A713CF818C274AA1C2E3862C7EB7023AF35D4 |
| 96 | 0 | 0 | 0D26B8D5452948E30FD29D36E8404C8456657A6CBEEFCD91BB14F91E291F2C1C8F4119F |
| 97 | 1 | 1 | 2CC0EEF167D75102669A814D11A51E569D07A7433A9762A292D7E2A4FE35B9130FD67DE |
| 98 | 2 | 2 | FB5CBD0CB6FA80C8B3560B4C443BA4900BF2729B160098C2F783A7752B88BA235010A1DA |
| 99 | 3 | 0 | 87BF4954022D30549DF7348477EACB97AC3565B838460CC62F242883313B15C31370335 |
| 100 | 4 | 1 | 076BF72542FB9FEBDEC3C316BC28CF0607BCEC5399EC9228905375D3D15F929B586D7E6 |
| . | . | . | . |
| . | . | . | . |
| . | . | . | . |
| 110 | 14 | 2 | 503F196BBF93C238BFD5E735E5AE52E0DAE64F5E2F4C3B92E553F51303C4A64C4403BF3 |
| 111 | 15 | 0 | CA346FCCF511822F524C043D2003F3B12DCFEA276B91BA98EB3984BBCFDF75C2A2E1B27 |
| 112 | 16 | 1 | 5FD4A6894566678C95B9D5A59DDE5366799045FEB03A2BAA74094140E9068C61C2E972C |
| 113 | 17 | 2 | E68AE62D2EE51B14F9D33ED737253CDB55A6E277254050830F2FE409E5EE284534FC3E5 | speeds. The described preambles and post-ambles may also be used to improve the accuracy of signal synchronization in time and frequency.

In one described implementation, for example, a cell identification sequence is used as a leading symbol of and as at least part of a preamble of every downlink subframe in time of a downlink signal from a base station to a mobile station. The cell identification sequence is one of a set of cell identification sequences and is designated to identify a base station and a cell sector of the base station. At least one data symbol is included, at a position subsequent to the cell identification sequence in time, in every downlink subframe of the downlink signal. In every other L frames of the downlink signal, a symbol is included at a position subsequent to the cell identification sequence in time and has a plurality of copies of a sequence placed sequentially in time. The parameter L is an integer greater than 0 and the sequence is common to at least a portion of base stations with which the mobile station is capable of communicating.

In another example, a group identification sequence is used as part of a downlink subframe from a base station to a mobile station to identify a group of base stations. Different group identification sequences are respectively assigned to different groups of base stations and different base stations in one

SUMMARY

This application describes, among others, techniques for fast cell search, cell selection, and cell reselection wireless communication systems such as OFDM or OFDMA communication systems. In various implementations described in this application, downlink subframes from base stations to mobile stations are designed to include information in form of preambles or post-ambles in one or more downlink subframes to facilitate cell search at receiving mobile stations at high group have a common group identification sequence. In the downlink subframe, a cell identification sequence is included to identify a specific base station and a cell sector of the base station in the group identified by the one group identification sequence in the downlink subframe. Various examples with specific subframe designs are described.

Processing techniques at mobile stations are described for cell search based on the various downlink subframes described in this application. For example, one method for operating a mobile station for wireless communications in this application includes the following. The mobile station is controlled to detect a downlink signal received from a base station. the downlink signal comprises a cell identification sequence as a leading symbol of and as at least part of a preamble of every downlink subframe in time, at least one data symbol, at a position subsequent to the cell identification sequence in time, in every downlink subframe of the downlink signal, and, in every other L frames of the downlink signal, at a position subsequent to the cell identification sequence in time, a symbol comprising a plurality of copies of a sequence placed sequentially in time. The parameter L is an integer greater than 0 and the sequence is common to at least a portion of base stations with which the mobile station is capable of communicating. the cell identification sequence is one of a set of cell identification sequences and is designated to identify a base station and a cell sector of the base station. In addition, the mobile station is controlled to perform synchronization in time and frequency based on the sequence and to perform a correlation between the cell identification sequencer and the set of cell identification sequences to identify the cell sector and the base station.

These and other implementations, variations and modifications are described in greater detail in the attached drawings, the detailed description and the claims.

DETAILED DESCRIPTION

Figure 1:
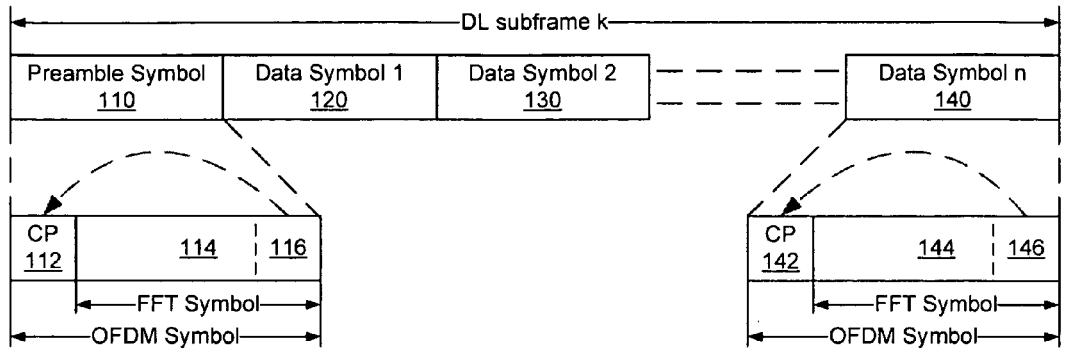
FIG. 1 shows an example of the time domain OFDMA downlink subframe structure.
Figure 2:
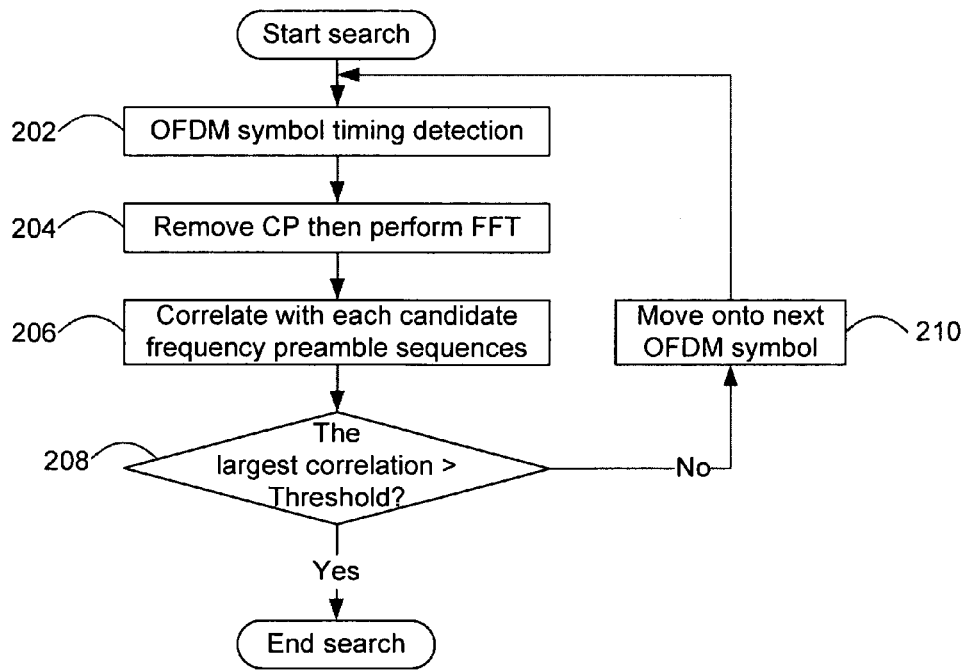
FIG. 2 illustrates a typical preamble detection procedure.

The example illustrated in FIGS. 1 and 2 shows that various OFDM and OFDMA systems under in IEEE 802.16 perform the correlation between a received cell identification sequence in a downlink signal and all possible cell identification sequences of the systems in processing each downlink subframe. For a 3-tier cellular system with 114 available preamble PN sequences for nineteen adjacent base stations, the mobile station computes 114 correlations when processing each downlink subframe during the cell search.

Existing preamble PN sequences for OFDM and OFDMA systems are referred to as "legacy preamble sequences" in part to indicate distinctions with new preambles described in this application. The amount of processing for the cell search at the mobile station can be significantly reduced by using one or more preambles that are common to some or all of the base stations in downlink subframes. Similarly, common post-ambles may also be used to facilitate fast cell search. In some implementations, correlations may be performed with only a selected portion of the available legacy preamble PN sequences to reduce the processing time at the mobile station for the cell search. The designs of the preambles and post-ambles for the downlink subframes described in this application retain the legacy preamble sequences. In some implementations, the downlink subframes based on the present designs are backward compatible to IEEE P802.16-REVd/D5-2004.

Some examples described here add a common preamble after the legacy cell-specific preamble or add a common post-amble every L subframes, where L is an integer number greater than 0, for fast time and frequency synchronization and fast cell search. This common preamble or post-amble may be implemented as repetitions of one sequence common for all base stations, or repetitions of one of N possible sequences each of which is common for a group of base stations.

In other examples, a common preamble may be added before or after the legacy cell-specific preamble, or add a common post-amble every L subframes, where L is an integer number greater than 0, for fast time and frequency synchronization and fast cell search. This common preamble or post-amble symbol may include the repetitions of the first time sequence that are in the first one half of the FFT symbol, the repetitions of the second time sequence that are in the second half of the FFT symbol, and the CP that is the copy of the last portion of the first time sequence; further there is one first sequence that is common for all base stations and there are N second sequences each of which is common for a mutually exclusive group of base stations.

In yet other examples, first and second common preamble symbols may be added before or after the legacy cell-specific preamble symbol, or first and second common post-amble symbols may be added every L subframes (L is an integer number greater than 0) for fast time and frequency synchronization and fast cell search. The first common preamble or post-amble may include one of N possible first sequences each of which is common for a mutually exclusive group of base stations; the second common preamble or post-amble may include one of M possible second sequences each of which is common for a mutually exclusive subgroup of those base stations that are from the same group of base stations. The two sequences may be included in two different OFDM symbols, i.e., the first sequence is in the first OFDM symbol and the second sequence is in the second OFDM symbol. The first and second OFDM symbols can be implemented, for example, in the same subframe, wherein the second OFDM symbol follows the first OFDM symbol closely in transmission. The first and second OFDM symbols can also be implemented in two different subframes next to each other in time.

Hence, in some applications, the mobile station can be controlled to process and use the first sequence for coarse timing and frequency synchronization, and the second sequence for fine timing and frequency synchronization. In other applications, the first sequence, the second sequence, or both the first and second sequences may be used by the mobile stations to reduce the number of possible cell-specific preamble sequence in the legacy preamble for fast cell determination. Also, the first sequence and the second sequence may be further divided into sub-sequences, and the resulting sub-sequences are assigned to different frequency subcarrier sets for different antennas in order to support MIMO-capable base stations.

Specific examples are now described in detail.

Figure 3A:
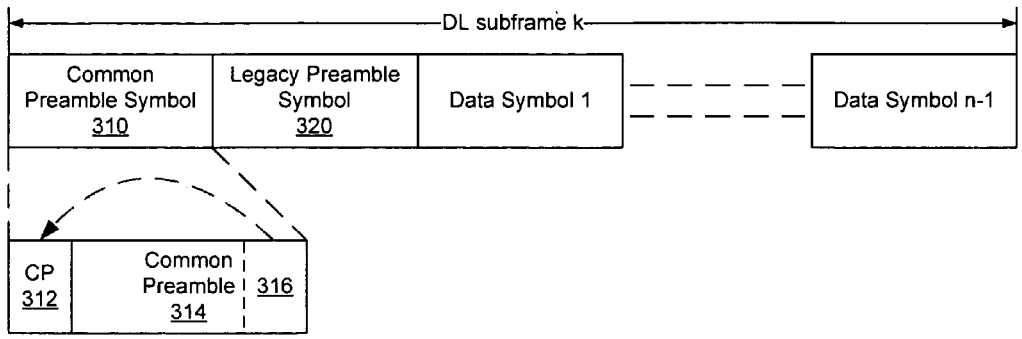
FIG. 3A shows an example of downlink subframe structure with a common preamble added before the legacy preamble.

FIG. 3A shows one example of a preamble structure that uses a CP as a common preamble symbol 310 which is added before the legacy cell-specific preamble symbol 320. The new common preamble symbol 310 has the inverse fast Fourier Transform (IFFT) of a PN sequence 314, which is common to all base station, and a CP 312, which is a copy of the last time portion 316 of the IFFT of the common preamble sequence 314. The common preamble sequence in frequency is known to all MSSs, e.g. it is the first PN sequence in Table 1 by the standard default. Therefore, the MSS receiver only needs to test the correlation of the unique time sequence of the common preamble in order to synchronize the timing. The common preamble sequence 314 in frequency is also carefully assigned to frequency subcarriers such that the IFFT of the common preamble sequence 314 has a repeated pattern in time. This may be accomplished by, e.g., assigning the common preamble sequence 314 onto the frequency subcarriers in an interlaced pattern while setting the subcarriers in between to zeros.

It can be shown that the following IFFT expression can be derived for this example:

$$IFFT([a_1,0,a_2,0,\ldots,a_{N/2},0])_N = [IFFT(a_1,a_2,\ldots,a_{N/2})_{N/2} IFFT(a_1,a_2,\ldots,a_{N/2})_{N/2}] \quad (1)$$

where $IFFT([x])_N$ represents the IFFT of a sequence x with a size of N, N is an even number, and $(a_1, a_2, \ldots, a_{N/2})$ is the common preamble sequence in frequency. Therefore, the MSS receiver can utilize the repetition characteristics to synchronize the frequency. After time and frequency synchronization, the MSS receiver can further determine the BS identity by correlating the received legacy cell-specific preamble with 114 candidate preamble sequences as illustrated in Table 1 above.

Figure 3B:
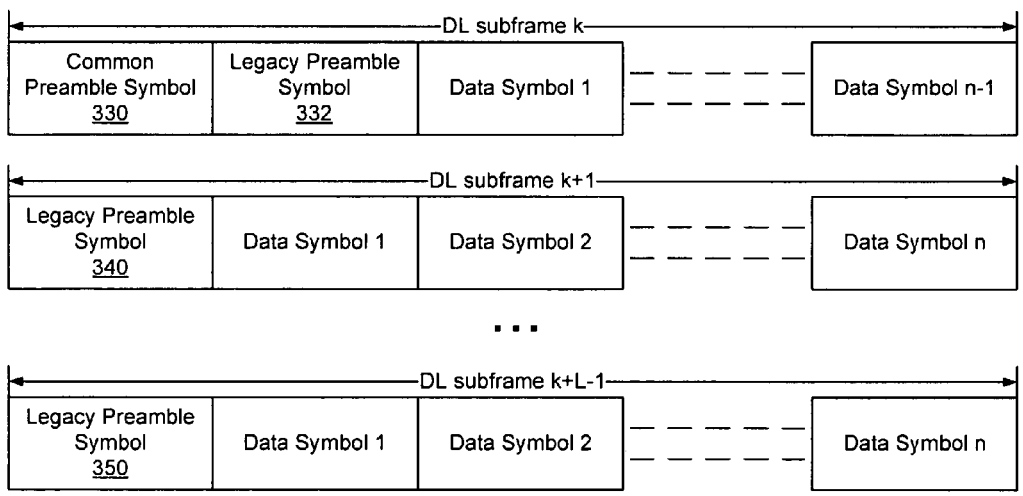
FIG. 3B illustrates the drawback of having different locations for the legacy cell-specific preamble when the common preamble is not transmitted in every subframe.

The added common preamble symbol in FIG. 3A can speed the initial cell search and acquisition process for newly arrived MSSs on one hand and can also be, on the other hand, an overhead that is unnecessary for those MSSs who already lock up with the system. Therefore, from system efficiency viewpoint, one may wish to limit the transmission of the common preamble symbol to once every L frames where L is greater than 1. FIG. 3B shows an example of the subframe structure. The legacy cell-specific preamble symbol 332 is the second OFDM symbol in the kth subframe as the common preamble symbol 330 is added before the legacy cell-specific preamble symbol 332. From the (k+1)th subframe to (k+L−1)th subframe, the legacy cell-specific preamble symbols 340 and 350 remain as the first OFDM symbol in each subframe. Therefore, this common preamble design adds unnecessary implementation complexity to the hardware and/or software of the MSS receiver, since the MSS receiver needs to acquire the cell-specific preamble symbols at different time locations for different subframes. The MSS receiver may further use the cell-specific preamble for channel estimation. In some implementations, the noisy channel estimation result can be further smoothed out by a low-pass filter. It is much easier to design a filter when the time between the samples remains constant. However, in the case shown in FIG. 3B, the time between channel estimation samples may vary between subframes.

Figure 4A:
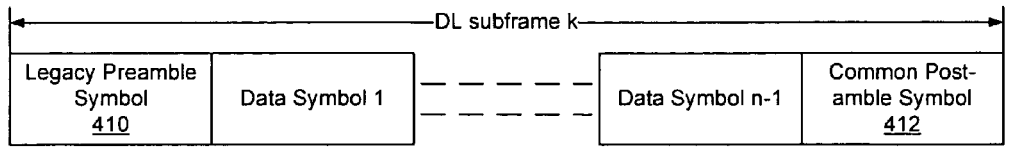
FIG. 4A shows an exemplary downlink subframe structure with a common post-amble.

FIG. 4A shows an improved design where a common post-amble symbol 412 is placed at the end of one downlink subframe. The common post-amble symbol 412 includes a CP and the IFFT of a common PN sequence. Similar to the common preamble symbol 310 shown in FIG. 3A, the common post-amble sequence is assigned to the frequency subcarriers in an interlaced pattern while setting the subcarriers in between to zeros. As a result, repetition of time waveform is obtained. With this new common post-amble structure, it is relatively easy to detect the symbol time by autocorrelation and to take advantage of the repetition property within the common post-amble symbol. The repeated post-amble patterns can also be used to estimate the frequency offset, which should have better performance than using CP based methods. This mitigates the unreliability issue caused by the coarse initial frequency estimation based on the CP correlation method. Notably, this design of the subframe places the legacy cell-specific preamble sequence as the first OFDM symbol in a subframe.

Figure 4B:
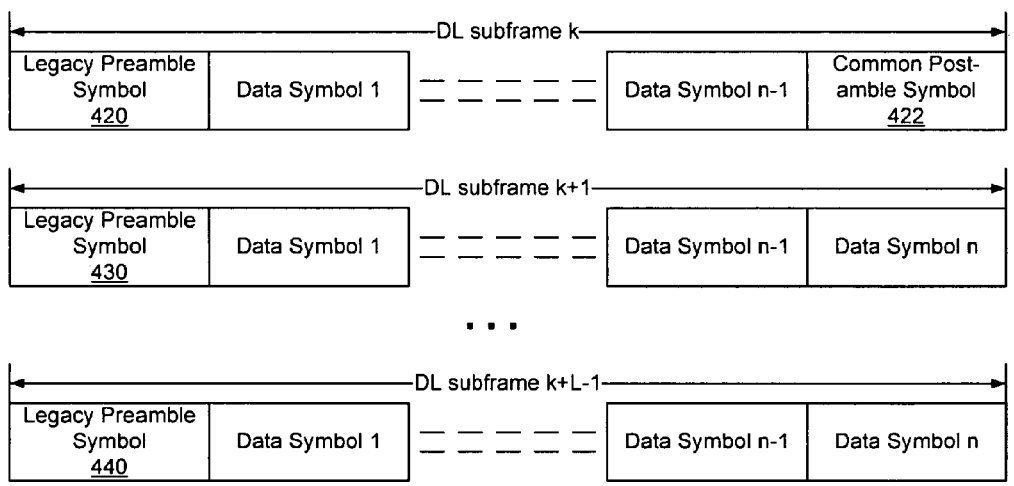
FIG. 4B illustrates that the legacy cell-specific preamble remains as the first OFDM symbol in every subframe when the common post-amble is not transmitted in every subframe.

FIG. 4B further shows that, the post-amble 422 does not have to be transmitted every subframe and may be transmitted every L subframes, where L is greater than 1. This common post-amble design is different from the common preamble design shown in FIG. 3A in that in the case shown in FIG. 4B, the legacy cell-specific preamble symbol 420, 430, 440 is always the first OFDM symbol in a subframe. As an alternative implementation, FIG. 4C shows a different common preamble design wherein the common preamble symbol 452 is added after the legacy cell-specific preamble symbol 450 such that the legacy cell-specific preamble symbol 450 is always the first OFDM symbol in a subframe.

Figure 4C:
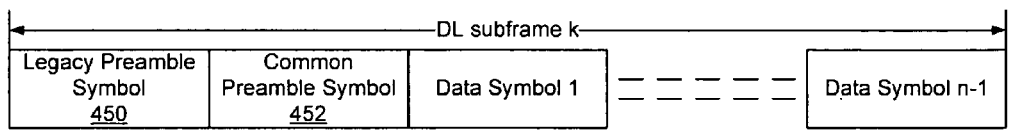
FIG. 4C shows an exemplary downlink subframe structure with a common preamble added after the legacy preamble.

One common feature in the above subframe designs in FIGS. 4A, 4B and 4C is that the legacy cell-specific preamble symbol is always the first OFDM symbol in a subframe. Under these designs, the MSS receiver can be simplified in its hardware and/or software for detecting and processing the legacy cell-specific preamble symbol because the MSS receiver can be controlled to look for the first OFDM symbol for the legacy cell-specific preamble symbol. In comparison, the system shown in FIG. 3B is more complex where the legacy cell-specific preamble symbol may be either at the first or the second OFDM symbol position in a downlink subframe and thus the position in time of the cell-specific preamble symbol varies from one subframe to another depending on the specific interlaced pattern for assigning the common preamble symbol to the subcarriers in the frequency domain. Accordingly, the MSS receiver for the system in FIG. 3B need be configured to monitor and detect the legacy cell-specific preamble sequence at the two different positions depending and thus require more complex hardware or software.

In the subframe designs in FIGS. 4A, 4B and 4C, after the common preamble 452 or common post-amble 412 is detected, the MSS tests the received legacy cell-specific preamble symbol 450 or 410 against all the candidate preamble sequences in order to obtain the cell identity. In the legacy cell-specific preamble sequences, different cell segments of different base stations are assigned with hand-crafted and unique sequences, respectively. Hence, a received sequence in a downlink subframe is compared to one of the all sequences at a time. Various implementations described in this application provide group identification (ID) sequences to represent different and mutually exclusive groups of all available sequences in the downlink frame. Hence, instead of blindly performing autocorrelation with all available sequences at the mobile station, the mobile station can be controlled to first identify a group to which a received downlink frame belongs and then to perform autocorrelations with only the sequences in the identified group. Therefore, the autocorrelations with sequences in other groups can be eliminated. In addition, some implementations may further use subgroup classification to divide each group into two or more mutually exclusive subgroups to further reduce the number of autocorrelations with the legacy cell-specific preamble sequences to be performed by the mobile station.

The following examples illustrate the use of group ID sequences to reduce the amount of the processing of the legacy cell-specific sequences and use a global SYNC symbol common to all base stations and networks for synchronization. In some implementations, the global SYNC symbol can use one common PN sequence for all BSs and networks and the group SYNC symbols may be generated from, e.g., 8 common PN sequences for all BSs and networks. Both group ID sequences and the global SYNC symbol may be designed to have time repetition structures. The global SYNC symbol simplifies the frequency and coarse frame timing synchronization for MSS in multi-sector multi-cell deployment. This feature can be important during the initial cell search after MSS is powered on. The group SYNC symbol can be used for fine timing synchronization and the group identification of the legacy cell-specific preamble, which can shorten the search time and reduce MSS processing power for the legacy preamble search. The global SYNC symbol facilitates the support of simple and fast cell search for neighboring cells. Based on the signal measurements of the global SYNC symbol, the group SYNC symbol can be used to identify the group IDs of the neighboring cells as handover (HO) candidates. The group SYNC symbol can be used to greatly reduce the number of legacy cell-specific preamble PN sequences used for neighboring cell search.

Figure 4D:
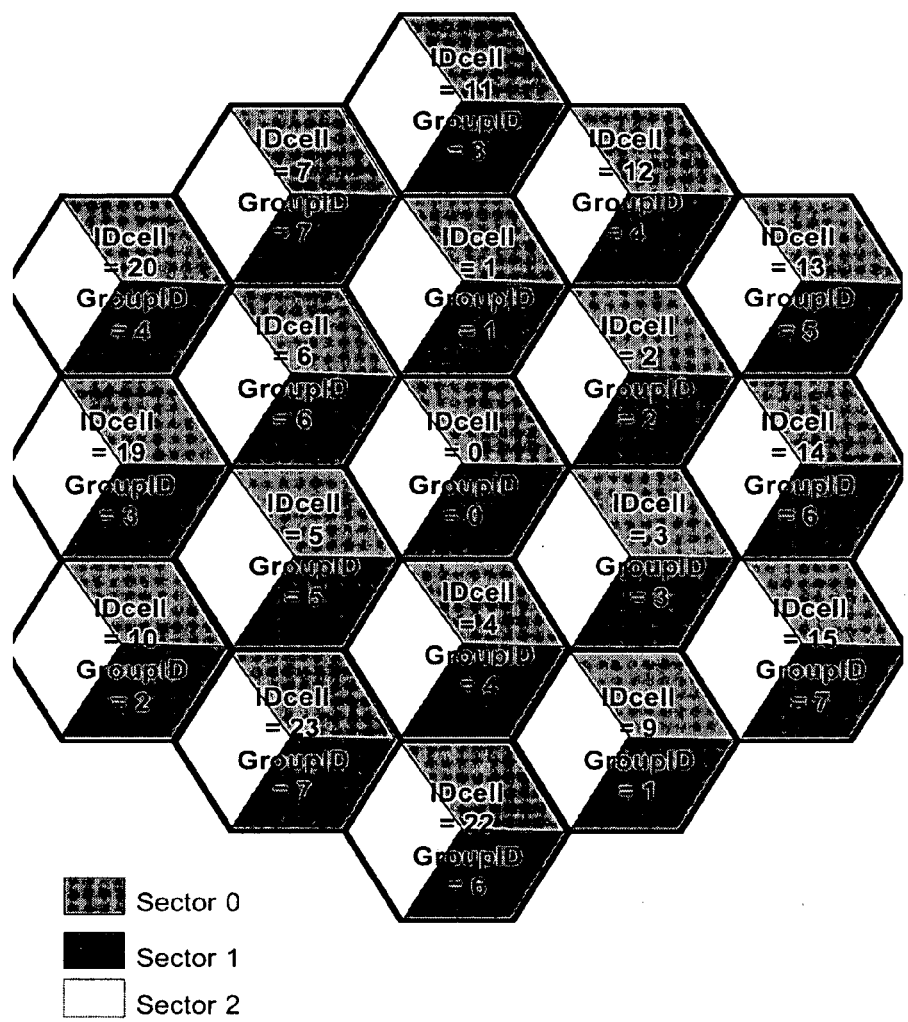
FIG. 4D shows an example of a cell structure that divides 19 adjacent base stations into different groups with group identification numbers.

FIG. 4D shows an example of a cell structure where 19 adjacent base stations are divided into 8 groups. In this cell structure, a mobile station is capable of communicating with these 19 base stations and may selectively communicate with only one of these 19 base stations as a current serving base station and monitor other base stations for handoff and other operations. Based on the grouping of different base stations shown in FIG. 4D, the common preamble symbol 310 as shown in FIG. 3A, or the common post-amble symbol 412 as shown in FIG. 4A, or the common preamble symbol 452 as shown in FIG. 4C may be designed to include long and short preamble or post-amble sections. Each of the long and short preamble or post-amble sections can be designed to have a repetition pattern in time with two or more identical segments to allow for synchronization in time and frequency.

Figure 5A:
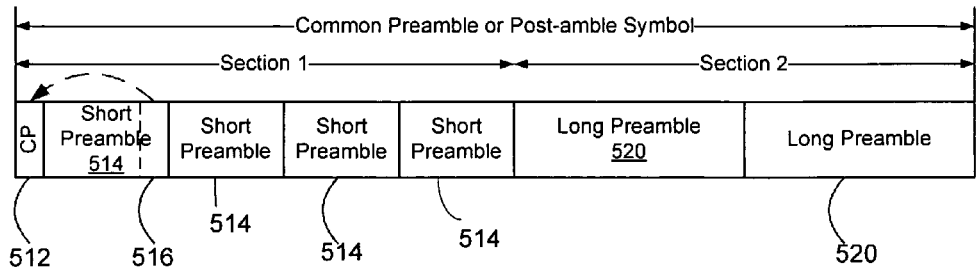
FIG. 5A illustrates an exemplary OFDM symbol structure of a common preamble or post-amble that contains two common preamble sequences in one OFDM symbol.
Figure 5B:
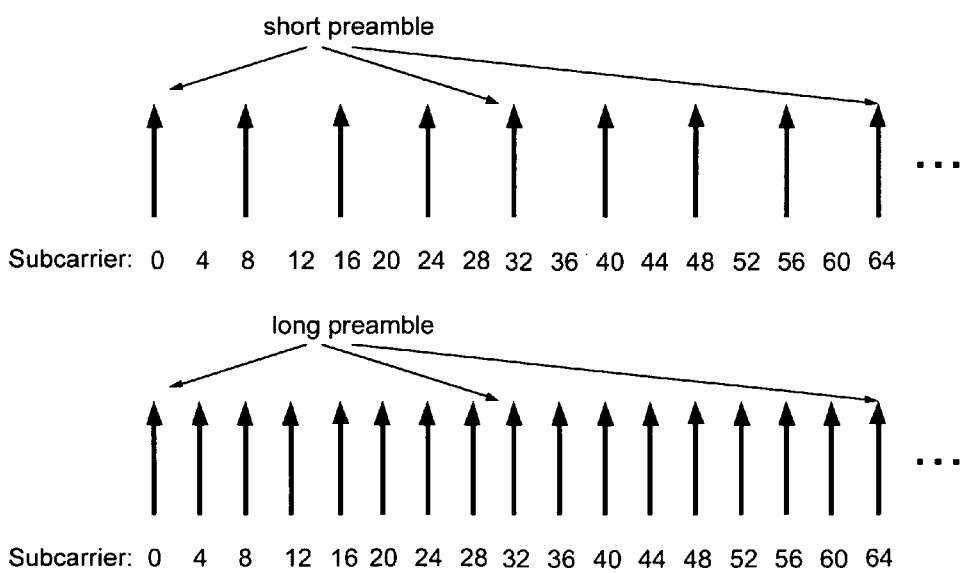
FIG. 5B illustrates the interlacing assignment pattern of preamble sequence in frequency in order to obtain a repetition pattern in time after the IFFT operation.

FIGS. 5A and 5B illustrate an example for the long and short preambles added to each downlink subframe. Long and short post-ambles can also be similarly constructed. FIG. 5A shows that the first section has the IFFT of a common short preamble 514. This short preamble includes a repetition pattern of 4 in time, and a CP 512 which is the copy of the last portion 516 of the IFFT of short preamble 514 of Section 1. The second section in this example has the IFFT of a common long preamble 520, which has a repetition pattern of 2 in time. The time duration of 2 repetitions of common long preamble 520 is the same as that of 4 repetitions of short preamble 514. The OFDM symbol time duration of the common preamble or post-amble shown in FIG. 5A is the same as a normal OFDM symbol time duration. In section 1, only one common short preamble PN sequence is needed for all base stations.

Equation (1) suggests that a preamble symbol with repetitions in time can be formed in two ways. One way is to first assign the preamble symbol to the frequency subcarriers in an interlaced pattern while setting the subcarriers in between to zeros, as shown in FIG. 5B, then perform the IFFT with the enlarged FFT size. The other way is to first perform the IFFT of the preamble sequence using a decimated FFT size and without interlacing with null subcarriers, then repeat the output of the IFFT in time. These two methods are mathematically equivalent. FIG. 5A is an illustration to visualize the second way.

With this new common preamble or post-amble symbol structure, the repetition property within the short preamble section can be used to detect the symbol time by autocorrelation. The repeated short preamble patterns can also be used to estimate the frequency offset. After the common preamble or post-amble symbol time is detected and the frequency offset is corrected, the MSS receiver can begin processing the common long preamble or post-amble section.

The common long preamble or post-amble under this may be used to one or more functions. For example, the long preamble or post-amble may be used to achieve more accurate symbol timing. The special structure of common long preamble section with a longer length in time can be used to tolerate larger timing errors. Therefore, the common long preamble section can be used to calculate channel profile through long preamble or post-amble correlation process to achieve better timing and frequency synchronization. For another example, the long preamble or post-amble may be used to carry additional information with its extra length in time that may be difficult to be included in the short preamble or post-amble. In the specific example illustrated here, the common long preamble or post-amble section is used to carry a group ID sequence which is used by the mobile station to reduce the numbers of candidate cell-specific preamble sequences for detection over the legacy cell-specific preamble symbol 320, 410, 450.

One example of using the group ID sequences in the long preambles or post-ambles are illustrated in FIGS. 5A and 5B where an additional OFDM symbol having both long and short preambles is included in a subframe along with a legacy cell-specific preamble sequence symbol as a preamble as in FIGS. 3A and 4C. Similarly, an additional OFDM symbol having both long and short post-ambles can be included in a subframe as a post-amble as in FIG. 4A.

Referring to the preamble example in FIGS. 5A and 5B, the cell-specific preamble sequences as shown in Table 1 above are first divided into several groups, for example, 8 groups. FIG. 4D shows such an example for the group assignment. Each group can be identified with a unique long preamble sequence, which can be treated as a group ID for the legacy cell-specific preambles. In the current example, there are totally 8 long preamble sequences for 8 different groups, respectively. Each BS sends the repetitions of IFFT of its long preamble 520 as a legacy preamble group ID in the second section of the common preamble as shown as FIG. 5B. Hence, to the base stations in a particular group, the long preamble is common. Long preambles are different for different groups due to the differences in the group ID sequences. The MSS can detect this group ID with much less complexity because of the smaller number of possible long preamble sequences (only 8) and shorter preamble length (only ¼ of the legacy preamble length). Once the MSS knows the preamble group ID, the MSS can start to search the possible cell-specific preamble sequences within that identified group over the received legacy cell-specific preamble symbol. In this example, the number of possible cell-specific preamble sequences in each group is only ⅛ of the total number of cell-specific preamble sequences, which is 15 or 16, instead of 114 in absence of the group classification.

In operation, the mobile station first processes the CP 512 and short preambles 514 to establish the initial synchronization in time and frequency. Next, the long preambles 520 are processed by the mobile station for (1) fine synchronization in time and frequency and (2) identification of a group of the received subframe. The identification of the group can be carried out by correlation between the received long preambles 512 with the know group identification sequences. After a group is selected, the mobile station proceeds to correlate the received legacy cell-specific preamble sequence in the received subframe with legacy cell-specific preamble sequences within the identified group. Hence, autocorrelations between the received legacy cell-specific preamble sequence and legacy cell-specific preamble sequences outside the identified group are not performed by the mobile station. This reduces the processing time for each subframe at the mobile station.

In other implementations, the long preambles and short preambles may be placed in different OFDM symbols. Each short preamble is still shorter than each long preamble but can be longer in time than a short preamble in the design in FIG. 5A where both long and short preambles are placed within a common OFDM symbol. As such, the short preambles in a separate OFDM symbol can be sufficiently long to include additional information other than just the common sequence, e.g., the group ID sequences while the long preambles include subgroup ID sequences in the examples below.

Figure 6A:
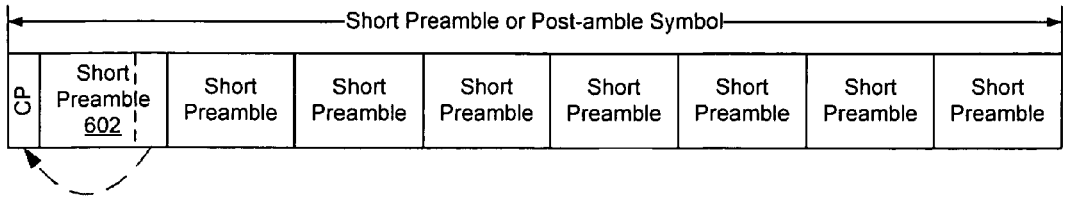
FIG. 6A shows an exemplary OFDM symbol structure of a common short preamble or post-amble symbol.
Figure 6B:
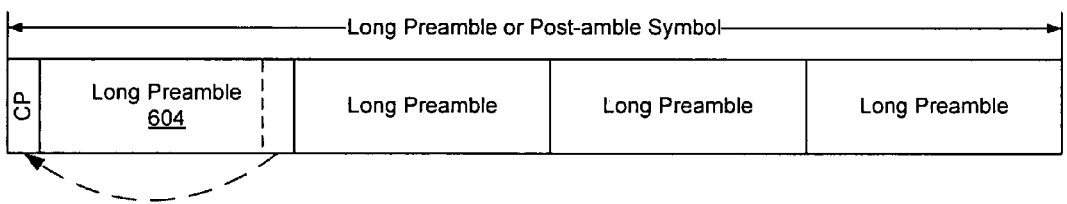
FIG. 6B shows an exemplary OFDM symbol structure of a common long preamble or post-amble symbol.

FIGS. 6A and 6B respectively show an example of a short preamble OFDM symbol with multiple identical preambles 602 and one CP before the leading short preamble in time, and an example of a separate long preamble OFDM symbol with multiple long preambles 604 and one CP before the leading long preamble in time. The short and long preamble symbols are designed for use in a single subframe or two different adjacent subframes. This use of the common short preamble sequences and common long preamble sequences in separate OFDM symbols can further enhance the cell search speed and other aspects of the cell search. In FIG. 6A, the common short preambles are 8 repetitions of the IFFT of a short preamble 602 and one CP. In FIG. 6B, the common long preamble or long post-amble symbol includes 4 repetitions of the IFFT of a long preamble 604 and one CP. Such separate OFDM symbols for short and long preambles may be used to construct the downlink subframes in various configurations. Examples of downlink subframes based on separate OFDM symbols for short and long preambles are now described with reference to FIGS. 6C through 6H, respectively.

Figure 6C:
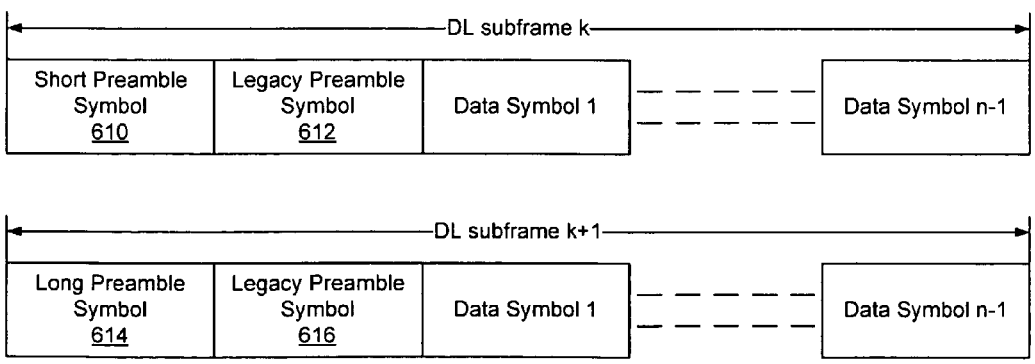
FIG. 6C shows an exemplary transmission of downlink subframes wherein the common short and long preamble symbols are inserted before the legacy cell-specific preamble in different subframes.

FIG. 6C shows a downlink subframe where the common short preamble symbol 610 and the common long preamble symbol 614 are inserted before the legacy preamble symbols 612 and 616 in alternate downlink subframes, respectively. First, the legacy cell-specific preamble sequences, as shown in Table 1 above, are divided into 4 different groups. Each group can be identified with a unique short preamble PN sequence. This short preamble PN sequence can be used to represent a group ID for the legacy cell-specific preambles within the group. Each preamble group is divided further into 8 different subgroups, and each subgroup can be identified with a unique long preamble PN sequence. This long preamble PN sequence can be used to represent a subgroup ID for the legacy cell-specific preambles. Under this exemplary group and subgroup scheme, there are a total of 8 long preamble PN sequences. All the MSSs know the short and long preamble PN sequences by a predetermined standardized default, e.g. the 8 long preamble sequences in frequency can be the first eight legacy PN sequences from Table 1, truncated from the end if needed in order for its IFFT to fit into the repetition pattern in time. The 4 short preamble PN sequences can be standardized in a similar way.

As a specific example, the group ID $PreambleGroupID_i$ and subgroup ID $PreambleSubGroupID_i$ for a cell-specific preamble with an index of i in Table 1, can be related to the its corresponding $IDcell_i$ as follows:

$$PreambleGroupID_i = \left[ \frac{IDcell_i}{8} \right] \qquad (2)$$

$$PreambleSubGroupID_i = \mod(IDcell_i)_8 \qquad (3)$$

where [ ] represents the integer operator and mod( ) represents the modulus operator. There are 31 or 32 legacy cell-specific preamble sequences associated with each group ID. The cell-specific preamble sequences sharing the same IDcell number are in the same subgroup of the same group. Each subgroup ID can be associated with 15 or 16 legacy cell-specific preamble PN sequences if the group ID is unknown. If the group ID is also known, each subgroup ID can be associated with 3 or 4 legacy cell-specific preamble PN sequences.

After the detection of common short and long preambles, the IDcell number can be obtained through the combination of the ID numbers that the common short and long preambles represent. For example, the value of the 2 most significant bits (MSBs) of IDcell, which can be a number from 0 to 3, is the group ID known from the detection of the common short preamble PN sequence. And the value of the rest 3 least significant bits (LSBs), which can be a number from 0 to 7, is the subgroup ID known from the detection of long preamble PN sequence.

In the example shown in FIG. 6C, the BS sends its short preamble as a group ID for the legacy cell-specific preambles in every even subframe. The MSS can detect this group ID with much less complexity because of the smaller number of possible short preamble sequences (only 4) and shorter preamble length (only 1/8 of the legacy preamble length). Once MSS obtains the preamble group ID, it can start to search the possible cell-specific preamble sequences within that particular group over the legacy cell-specific preamble symbol. The number of possible cell-specific preamble sequences in each group is only 1/4 of the total number of cell-specific preamble sequences. Further, the BS sends its long preamble as a subgroup ID for the legacy cell-specific preambles in every odd subframe. The MSS can detect this subgroup ID also with much less complexity because of the smaller number of possible long preamble sequences (only 8) and shorter preamble length (only 1/4 of the legacy preamble length).

There may be two scenarios in identifying the candidates of the cell-specific preamble sequence under this specific circumstance:

1. If the MSS has already obtained the group ID from the previous subframe, once MSS knows the legacy preamble subgroup ID through the long preamble correlation, the MSS immediately knows the IDcell number. The MSS can start to search the possible cell-specific preamble sequences with the particular IDcell over the legacy cell-specific preamble symbol. The number of possible cell-specific preamble sequences in each subgroup is only 1/32 of the total number of cell-specific preamble sequences, which is only 3 or 4.

2. If the MSS can successfully obtain the subgroup ID through the long preamble correlation without the knowledge of the group ID, the MSS knows that the candidates of cell-specific preamble sequence can be in the particular subgroup of any one of 4 groups. Therefore MSS can start to search the possible cell-specific preamble sequences within the particular subgroup of all 4 groups over the legacy preamble symbol. The total number of candidates of cell-specific preamble sequence is 1/8 of the total number of cell-specific preamble sequences, which is 15 or 16.

In addition, with the common short and long preamble sequences, it can be relatively easy to detect the symbol time at the mobile station by using the autocorrelation property of the sequences. The repetitions of short preamble pattern can also be used to estimate the frequency offset, which should have better performance than using CP based methods. The MSS receiver further performs the long preamble correlation process to achieve better timing and frequency synchronization and to reduce the number of candidate cell-specific preamble sequences to search for.

Figure 6D:
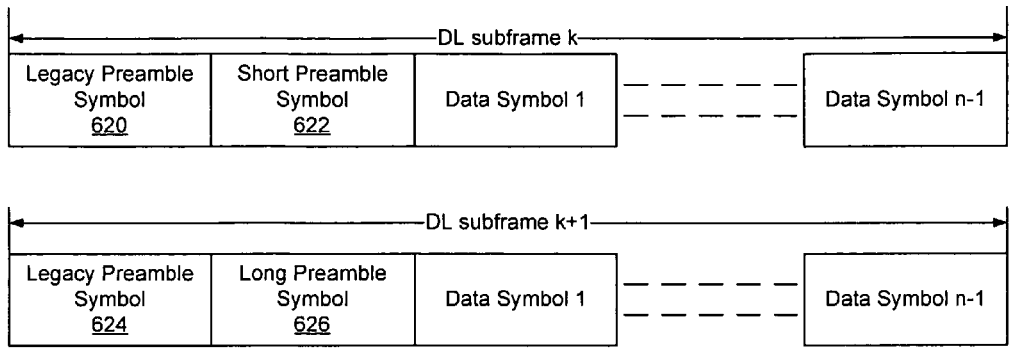
FIG. 6D shows an exemplary transmission of downlink subframes wherein the common short and long preamble symbols are inserted after the legacy cell-specific preamble in different subframes.

FIG. 6D shows an example of an alternative use of long and short preamble symbols separately in two adjacent subframes. In this example, the common short preamble symbol 622 and the common long preamble symbol 626 are the same as shown in FIGS. 6A and 6B, respectively, except that the common short preamble symbol 622 and the common long preamble symbol 626 are placed after the legacy cell-specific preamble 620 and 624, respectively. In this symbol arrangement, the legacy cell-specific preamble 620 and 624 will always be the first OFDM symbol in each subframe if the common short preamble symbol 622 or the common long preamble symbol 626 is not needed in every subframe. As a result, the hardware and/or software of the MSS receiver can be simplified, due to similar reasons illustrated in FIG. 4B vs. FIG. 3B.

Figure 6E:
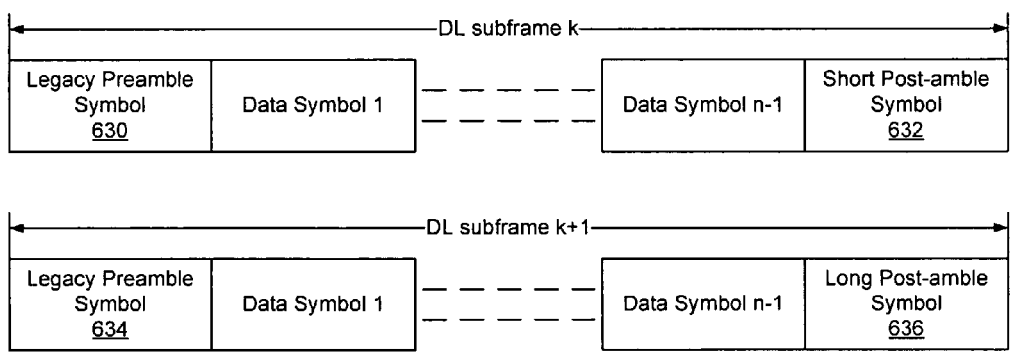
FIG. 6E shows an exemplary transmission of downlink subframes wherein common short and long post-amble symbols are inserted in different subframes.

For the same reason of reducing implementation complexity, FIG. 6E shows another alternative realization, wherein the common short post-amble symbol 632 and the common long post-amble symbol 636 are the same as the common short and long preambles as shown in FIGS. 6A and 6B, respectively, except that the common short post-amble symbol 632 and the common long post-amble symbol 636 are placed at the end of two different downlink subframe, respectively, so that the legacy cell-specific preamble (630 and 634) remains as the first OFDM symbols for each subframe.

Figure 6F:
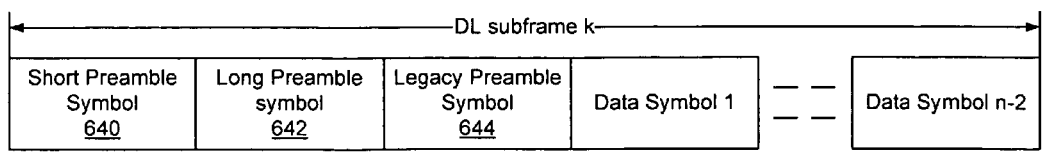
FIG. 6F shows an exemplary downlink subframes wherein the common short and long preamble symbols are inserted before the legacy Cell-specific preamble in the same subframes.

FIG. 6F shows an example of a use of the long and short preamble symbols within one subframe. The common short preamble symbol 640 and the common long preamble symbol 642 are the same as shown in FIGS. 6A and 6B, respectively and the common short preamble symbol 640 and the common long preamble symbol 642 are inserted before the legacy cell-specific preamble symbol 644 in the same downlink subframe.

Figure 6G:
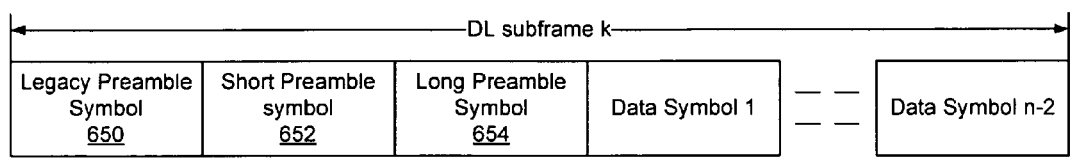
FIG. 6G shows an exemplary downlink subframes wherein the common short and long preamble symbols are inserted after the legacy Cell-specific preamble in the same subframes.

FIG. 6G shows another example for using the long and short preamble symbols within one subframe. The common short preamble symbol 652 and the common long preamble symbol 654 are the same as shown in FIGS. 6A and 6B, respectively. The common short preamble symbol 652 and the common long preamble symbol 654 are placed after the legacy cell-specific preamble symbol 650, so that the legacy cell-specific preamble symbol 650 remains as the first OFDM symbol for each downlink subframe, not matter how frequent the common short preamble symbol 652 and the common long preamble symbol 654 are inserted, therefore simplifying the MSS receiver implementation.

Figure 6H:
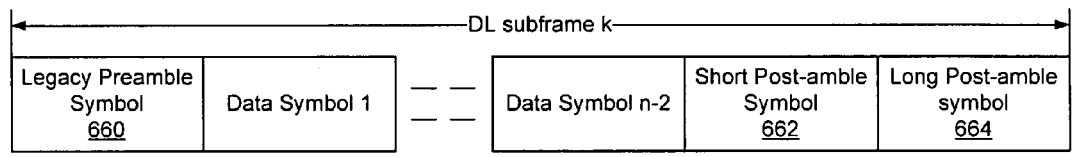
FIG. 6H shows an exemplary downlink subframes wherein the common short and long post-amble symbols are inserted in the same subframes.

FIG. 6H shows yet another example for using the long and short preamble symbols within one subframe realization. The common short post-amble symbol 662 and the common long post-amble symbol 664 are the same as the common short and long preambles shown in FIGS. 6A and 6B. The common short post-amble symbol 662 and the common long post-amble symbol 664 are placed at the end of the downlink subframe, so that the legacy cell-specific preamble symbol 660 remains as the first OFDM symbol for each downlink subframe, therefore simplifying the MSS receiver implementation.

The above long and short preambles may also be used to support the BS that is capable with MIMO (Multiple Input Multiple Output) antenna technology. MIMO antenna technology uses two or more transmitter antennas in a transmitter, e.g., the base station, to implement transmission diversity (often referred to as "transmit diversity") based on the space-time coding (STC) to mitigate signal fading due to various factors including the multipath fading.

Figure 7A:
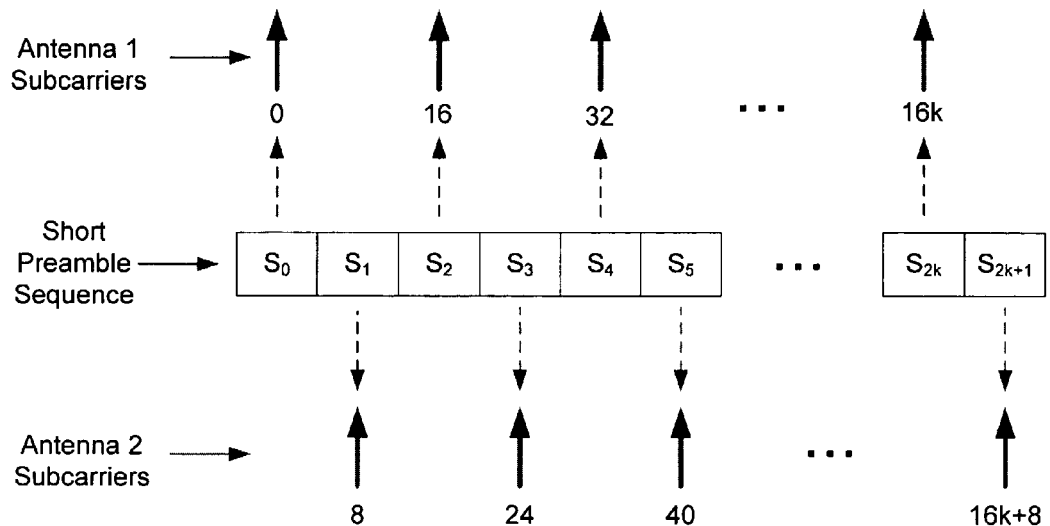
FIG. 7A shows an example of the short preamble bits and subcarriers assignment in the case of 2 antennas configuration.
Figure 7B:
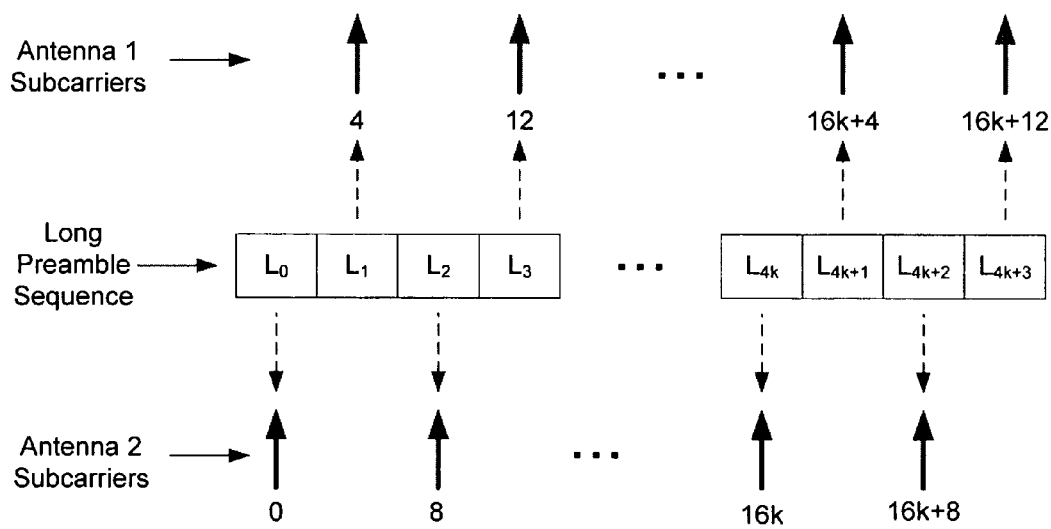
FIG. 7B shows an example of the long preamble bits and subcarriers assignment in the case of 2 antennas configuration.
Figure 7C:
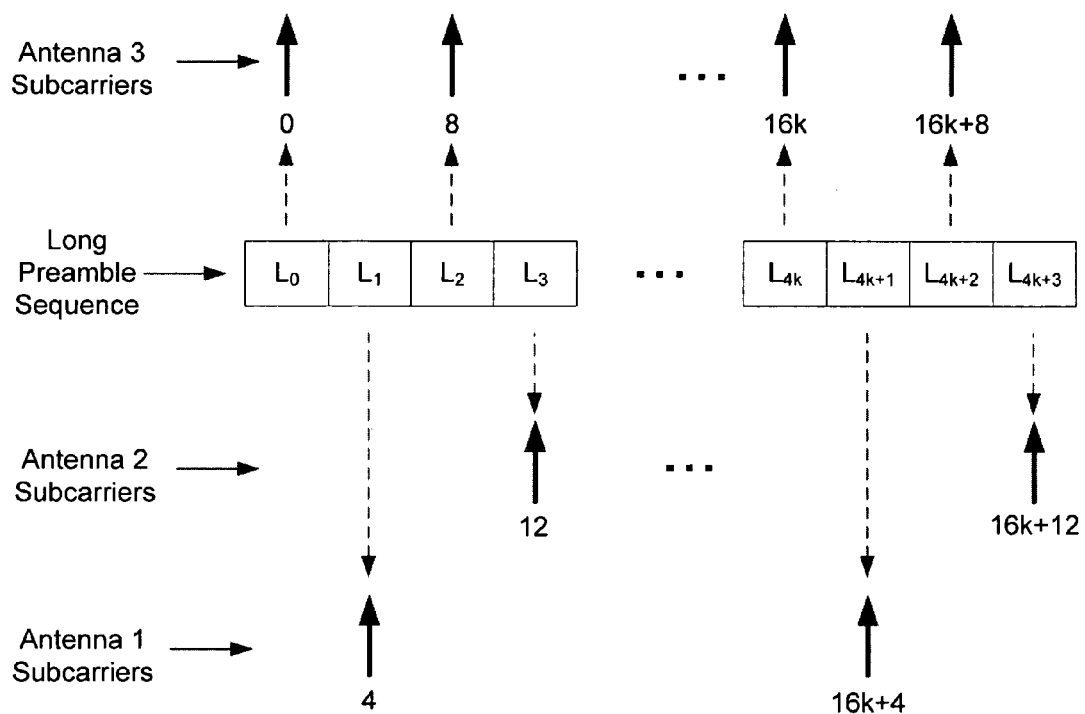
FIG. 7C shows an example of the long preamble bits and subcarriers assignment in the case of 3 antennas configuration.

In some implementations, the common short and long preamble PN sequences can be divided into sub-sequences, as shown in the FIGS. 7A, 7B, and 7C. Each short preamble PN sequence has 2 sub-sequences, and each long preamble PN sequence has 4 sub-sequences with the subcarrier assignment as follows:

$$\text{ShortPreambleCarrierSet}_i = i + 2k \quad (4)$$

$$\text{LongPreambleCarrierSet}_j = j + 4k \quad (5)$$

where i=0, 1 is the number of the short preamble carrier-set, j=0, 1, 2, 3 is the number of the long preamble carrier-set, and k is the running PN sequence bit index 0, 1, 2, 3, 4, . . . . Table 2 lists the examples of carrier-set assignment for the common short and long preambles for BS with MIMO capability supporting up to 4 antennas.

TABLE 2

| Number of Antennas | Short Preamble Carrier-sets | Long Preamble Carrier-sets |
|---|---|---|
| 1 | Antenna 1: 0 and 1 | Antenna 1: 0, 1, 2, and 3 |
| 2 | Antenna 1: 0 | Antenna 1: 1 and 3 |
|   | Antenna 2: 1 | Antenna 2: 0 and 2 |
| 3 | Antenna 1: 0 | Antenna 1: 1 |
|   | Antenna 2: 1 | Antenna 2: 3 |
|   | Antenna 3: null | Antenna 3: 0 and 2 |
| 4 | Antenna 1: 1 | Antenna 1: 0 |
|   | Antenna 2: 0 | Antenna 2: 1 |
|   | Antenna 3: 0 | Antenna 3: 2 |
|   | Antenna 4: 1 | Antenna 4: 3 |

FIG. 7A visualizes an example of the short preamble bits and subcarriers assignment in the case of 2 antennas configuration as listed in Table 2. One sub-sequence of the short preamble, which consists of the even bits of the short preamble, is assigned to one half set of subcarriers (comparing to the full set of subcarriers shown in FIG. 5B), then the subcarriers in between are set to zeros, then an IFFT is performed, then a CP is added, then the resulting waveform is transmitted on Antenna 1. Meanwhile the other sub-sequence, which consists of the odd bits of the short preamble, is assigned to the other half set of subcarriers, then the subcarriers in between are set to zeros, then an IFFT is performed, then a CP is added, then the resulting waveform is transmitted on Antenna 2. The MSS receives the composite short preamble signals from Antennas 1 and 2. After the FFT operation, the MSS receiver can use the entire short preamble sequence for correlation process in order to find out the group ID.

FIG. 7B visualizes an example of the long preamble bits and subcarriers assignment in the case of 2 antennas configuration as listed in Table 2. Two out of four sub-sequences of the long preamble, which consist of the odd bits of the long preamble, are assigned to one half set of subcarriers, then the subcarriers in between are set to zeros, then an IFFT is performed, then a CP is added, then the resulting waveform is transmitted on Antenna 1. Meanwhile the other two sub-sequences, which consist of the even bits of the long preamble, are assigned to the other half set of subcarriers, then the subcarriers in between are set to zeros, then an IFFT is performed, then a CP is added, then the resulting waveform is transmitted on Antenna 2. After the FFT operation, the MSS receiver can use the entire long preamble sequence for correlation process in order to find out the subgroup ID. Then the MSS can detect the legacy cell-specific preamble for a limited number of possible candidates given the detected group ID and subgroup ID.

FIG. 7C visualizes an example of the long preamble bits and subcarriers assignment in the case of 3 antennas configuration as listed in Table 2. Two out of four sub-sequences of the long preamble, which consist of the even bits of the long preamble, are assigned to one half set of subcarriers, then the subcarriers in between are set to zeros, then an IFFT is performed, then a CP is added, then the resulting waveform is transmitted on Antenna 3. Meanwhile one of the two remaining sub-sequences is assigned to one of the two remaining ¼ set of subcarriers, then the subcarriers in between are set to zeros, then an IFFT is performed, then a CP is added, then the resulting waveform is transmitted on Antenna 1. Similar process is used on Antenna 2.

As shown in Table 2, we try to use the different subcarriers for the sub-sequences of the short and long preambles on the same antenna as much as possible in order to explore frequency diversity.

In implementations, the above described techniques and their variations may be implemented as computer software instructions or firmware instructions. Such instructions may be stored in an article with one or more machine-readable storage media or stored in one or more machine-readable storage devices connected to one or more computers. In operation, the instructions are executed by, e.g., one or more computer processors, to cause the machine to perform the described functions and operations. For example, the techniques for generating the downlink subframes may be implemented as computer instructions stored in the base stations or a control module that controls base stations. The techniques for processing the downlink subframes may be implemented as computer instructions stored in the mobile stations.

Only a few examples are described. However, other implementations and enhancements may be made based on what is described and illustrated here.

What is claimed is:

1. A method for wireless communications, comprising:

using a cell identification sequence as a leading symbol of and as at least part of a preamble of every downlink subframe in time of a downlink signal from a base station to a mobile station, wherein the cell identification sequence is one of a set of cell identification sequences and is designated to identify a base station and a cell sector of the base station;

including at least one data symbol, at a position subsequent to the cell identification sequence in time, in every downlink subframe of the downlink signal; and including in every other L frames of the downlink signal, at a position subsequent to the cell identification sequence in time, a symbol comprising a plurality of copies of a sequence placed sequentially in time, wherein L is an integer greater than 0 and the sequence is common to at least a portion of base stations with which the mobile station is communicating.

2. A method as in claim 1, wherein the sequence is common to all of the base stations.

3. A method as in claim 1, wherein the base stations are divided into a plurality of different groups and each group has a plurality of base stations, and wherein the sequence is common to one group of the base stations and varies from one group to another.

4. A method as in claim 1, wherein the symbol further comprises, at a position in time subsequent to the plurality of copies of the sequence, a plurality of copies of a long sequence, wherein the long sequence is longer in time than the sequence.

5. A method as in claim 4, wherein the base stations are divided into a plurality of different groups and each group has a plurality of base stations, and wherein the long sequence is a group identification sequence and is common to one group of the base stations.

6. A method as in claim 4, wherein the symbol further comprises a cyclic prefix positioned in time prior to the plurality of copies of the sequence, wherein the cyclic prefix is a copy of a last segment of the sequence.

7. A method as in claim 1, wherein the symbol further comprises a cyclic prefix positioned in time prior to the plurality of copies of the sequence, wherein the cyclic prefix is a copy of a last segment of the sequence.

8. A method as in claim 1, wherein the symbol is placed in time after the leading symbol and before the at least one data symbol.

9. A method as in claim 1, wherein the symbol is placed in time at an end of a subframe as a post-amble.

10. A method as in claim 1, further comprising:
including a second symbol at a position in time subsequent to the symbol with the plurality of copies of the sequence, and plurality of copies of a long sequence, wherein the long sequence is longer in time than the sequence,
wherein the sequence comprises a group identification sequence to identify a group of base stations among a plurality of different groups, and
wherein the long sequence comprises a subgroup identification sequence to identify a subgroup of base stations among each group of base stations.

11. A method as in claim 10, further comprising:
dividing the sequence into a plurality of short subsequences;
assigning, in frequency, the short subsequences to different subcarriers as different short subsequence carrier sets;
dividing the long sequence into a plurality of long subsequences;
assigning, in frequency, the long subsequences to different subcarriers as different long subsequence carrier sets; and
assigning the different short and long subsequence carrier sets to two or more different antennas in the base station for downlink transmission.

12. A method for wireless communications, comprising:
controlling a mobile station to detect a downlink signal received from a base station, wherein the downlink signal comprises a cell identification sequence as a leading symbol of and as at least part of a preamble of every downlink subframe in time, at least one data symbol, at a position subsequent to the cell identification sequence in time, in every downlink subframe of the downlink signal, and, in every other L frames of the downlink signal, at a position subsequent to the cell identification sequence in time, a symbol comprising a plurality of copies of a sequence placed sequentially in time, wherein L is an integer greater than 0 and the sequence is common to at least a portion of base stations with which the mobile station is communicating,
wherein the cell identification sequence is one of a set of cell identification sequences and is designated to identify a base station and a cell sector of the base station;
controlling the mobile station to perform synchronization in time and frequency based on the sequence; and controlling the mobile station to perform a correlation between the cell identification sequencer and the set of cell identification sequences to identify the cell sector and the base station.

13. A method as in claim 12, wherein the symbol further comprises, at a position in time subsequent to the plurality of copies of the sequence, a plurality of copies of a long sequence, wherein the long sequence is longer in time than the sequence, and
the method further comprising:
controlling the mobile station to process the plurality of copies of the sequence in the symbol for coarse synchronization in time and frequency; and
controlling the mobile station to process the plurality of copies of the long sequence in the symbol for fine synchronization in time and frequency.

14. A method as in claim 12, wherein the symbol further comprises, at a position in time subsequent to the plurality of copies of the sequence, a plurality of copies of a long sequence, wherein the long sequence is longer in time than the sequence and is a group identification sequence and is common to one group of the base stations among different groups of the base stations,
the method further comprising:
controlling the mobile station to process the plurality of copies of the long sequence in the symbol and to identify a group to which the base station emitting the downlink signal belongs; and
controlling the mobile station to perform correlations between the cell identification sequence in the downlink signal with only a portion of the set of cell identification sequences for the identified group, without performing correlations between the cell identification sequence in the downlink signal and cell identification sequences for groups other than the identified group.

15. A method as in claim 12, wherein the downlink signal further comprises a second symbol being at a position in time subsequent to the symbol with the plurality of copies of the sequence and comprising a plurality of copies of a long sequence, wherein the long sequence is longer in time than the sequence,
wherein the sequence comprises a group identification sequence to identify a group of base stations among a plurality of different groups, and
wherein the long sequence comprises a subgroup identification sequence to identify a subgroup of base stations among each group of base stations,
the method further comprising:
controlling the mobile station to process the plurality of copies of the sequence in the symbol and to identify a group to which the base station emitting the downlink signal belongs;
controlling the mobile station to process the plurality of copies of the long sequence in the second symbol and to identify a subgroup within the identified group; and
controlling the mobile station to perform correlations between the cell identification sequence in the downlink signal with only a portion of the set of cell identification sequences for the identified subgroup, without performing correlations between the cell identification sequence in the downlink signal and cell identification sequences for subgroups other than the identified subgroup and for groups other than the identified group.

16. A method as in claim 12, wherein the downlink signal further comprises a second symbol being at a position in time subsequent to the symbol with the plurality of copies of the sequence and comprising a plurality of copies of a long sequence, wherein the long sequence is longer in time than the sequence,
wherein the sequence comprises a group identification sequence to identify a group of base stations among a plurality of different groups, and
wherein the long sequence comprises a subgroup identification sequence to identify a subgroup of base stations among each group of base stations,
the method further comprising:
controlling a mobile station which receives the downlink signal to process the plurality of copies of the long sequence in the second symbol and to identify a subgroup to which the base station emitting the downlink signal belongs; and controlling the mobile station to perform correlations between the cell identification sequence in the downlink signal with only a portion of the set of cell identification sequences for the identified subgroup for all groups, without performing correlations between the cell identification sequence in the downlink signal and cell identification sequences for subgroups other than the identified subgroup.

17. A method for wireless communications, comprising:
using one group identification sequence as part of a downlink subframe from a base station to a mobile station to identify a group of base stations, wherein different group identification sequences are respectively assigned to different groups of base stations and different base stations in one group have a common group identification sequence;
including in the downlink subframe a cell identification sequence to identify a specific base station and a cell sector of the base station in the group identified by the one group identification sequence in the downlink subframe, wherein the cell identification sequence is one of a set of cell identification sequences and is designated to identify a base station and a cell sector of the base station; and
including at least one data symbol, at a position subsequent to the cell identification sequence in time, in every downlink subframe of the downlink signal; and including in every other L frames of the downlink signal, at a position subsequent to the cell identification sequence in time, a symbol comprising a plurality of conies of a sequence placed sequentially in time, wherein L is an integer greater than 0 and the sequence is common to at least a portion of base stations with which the mobile station is communicating.

18. A method as in claim 17, wherein the one group identification sequence and the cell identification sequence in the downlink subframe are included as part of a preamble of the downlink subframe.

19. A method as in claim 18, further comprising:
including a plurality of identical short preambles sequentially in time in a first section of the preamble and a plurality of identical long preambles in a second section of the preamble subsequent to the first section, wherein each long preamble includes the one group identification sequence and is longer in time than each short preamble and is common for base stations in one group.

20. A method as in claim 19, wherein there are four short preambles and two long preambles in the preamble, wherein a length of each short preamble in time is one half of a length of each long preamble.

21. A method as in claim 19, further comprising including a cyclic prefix at a beginning portion of the preamble in time, wherein the cyclic prefix is a copy of a last segment of a short preamble following the cyclic prefix in time.

22. A method as in claim 19, further comprising:
placing the plurality of short preambles and the plurality of long preambles within one OFDM symbol in the downlink subframe.

23. A method as in claim 22, further comprising:
including a first cyclic prefix at a beginning portion of the one OFDM symbol, wherein the first cyclic prefix is a copy of a last segment of a short preamble following the first cyclic prefix in time.

24. A method as in claim 19, wherein the short preambles are common to all base stations.

25. A method as in claim 19, further comprising:
dividing each short preamble into a plurality of short subsequences;
assigning, in frequency, the short subsequences to different subcarriers as different short subsequence carrier sets;
dividing each long preamble into a plurality of long subsequences;
assigning, in frequency, the long subsequences to different subcarriers as different long subsequence carrier sets; and
assigning the different short and long subsequence carrier sets to two or more different antennas in the base station for downlink transmission.

26. A method as in claim 18, wherein the cell identification sequence is placed at a beginning portion of the preamble in time.

27. A method as in claim 18, wherein the one group identification sequence is placed before the cell identification sequence within the preamble in time.

28. A method as in claim 17, further comprising:
including a long preamble symbol in the downlink subframe as part of a preamble for the downlink subframe, wherein the long preamble symbol includes a plurality of identical sequential long preambles;
including the one cell identification sequence as part of the preamble for the downlink subframe; and
placing a second downlink subframe immediately ahead of the downlink subframe in time to include a second preamble which includes a copy of the one cell identification sequence and a short preamble symbol which includes a plurality of identical sequential short preambles, wherein each short preamble is shorter than each long preamble.

29. A method as in claim 28, wherein the one cell identification sequence is at a beginning portion of the preamble in time and the long preamble symbol is placed immediately after the one cell identification sequence in time, and wherein the copy of the one cell identification sequence is at a beginning portion of the second preamble in time and the short preamble symbol is placed immediately after the copy of the one cell identification sequence in the second preamble in time.

30. A method as in claim 29, further comprising:
including a first cyclic prefix immediately before the leading long preamble in the preamble of the downlink subframe, wherein the first cyclic prefix is a copy of a last segment of the leading short preamble in time; and
including a second cyclic prefix immediately before the leading short preamble in the second preamble of the second downlink subframe, wherein the second cyclic prefix is a copy of a last segment of the leading short preamble in time.

31. A method as in claim 28, wherein the long preamble symbol is at a beginning portion of the preamble in time and the one cell identification sequence is placed immediately after the long preamble symbol in time, and wherein the short preamble symbol is at a beginning portion of the second preamble in time and the copy of the one cell identification sequence is placed immediately after the short preamble symbol in the second preamble in time.

32. A method as in claim 31, further comprising:
including a first cyclic prefix immediately before the leading long preamble in the preamble of the downlink subframe, wherein the first cyclic prefix is a copy of a last segment of the leading short preamble in time; and including a second cyclic prefix immediately before the leading short preamble in the second preamble of the second downlink subframe, wherein the second cyclic prefix is a copy of a last segment of the leading short preamble in time.

33. A method as in claim 28, further comprising:
dividing each short preamble into a plurality of short subsequences;
assigning, in frequency, the short subsequences to different subcarriers as different short subsequence carrier sets;
dividing each long preamble into a plurality of long subsequences;
assigning, in frequency, the long subsequences to different subcarriers as different long subsequence carrier sets; and
assigning the different short and long subsequence carrier sets to two or more different antennas in the base station for downlink transmission.

34. A method as in claim 28, further comprising: including a long preamble symbol in the downlink subframe as part of the preamble for the downlink subframe, wherein the long preamble symbol includes a plurality of identical sequential long preambles each comprising a subgroup identification sequence to identify one of a plurality of subgroups within one group; including the one cell identification sequence as part of the preamble for the downlink subframe; and including a short preamble symbol as part of the preamble for the downlink subframe, wherein the short preamble symbol is equal in length in time to the long preamble symbol and includes a plurality of identical sequential short preambles, wherein each short preamble is shorter than each long preamble and includes the one group identification sequence.

35. A method as in claim 34, wherein the short preamble symbol is placed in time before the long preamble symbol which is placed in time before the one cell identification sequence.

36. A method as in claim 34, wherein the short preamble symbol is placed in time before the long preamble symbol and the one cell identification sequence is placed in time before the short preamble symbol.

37. A method as in claim 34, further comprising:
dividing each short preamble into a plurality of short subsequences;
assigning, in frequency, the short subsequences to different subcarriers as different short subsequence carrier sets;
dividing each long preamble into a plurality of long subsequences;
assigning, in frequency, the long subsequences to different subcarriers as different long subsequence carrier sets; and
assigning the different short and long subsequence carrier sets to two or more different antennas in the base station for downlink transmission.

38. A method as in claim 17, wherein the one group identification sequence is included as part of a post-amble at the end in time of the downlink subframe, and the cell identification sequence is included as part of a preamble at the beginning in time of the downlink subframe.

39. A method as in claim 38, further comprising:
including a plurality of identical short post-ambles sequentially in a first section of the post-amble in time and a plurality of identical long post-ambles in a second section of the post-amble subsequent to the first section, wherein each short post-amble includes the one group identification sequence and is shorter in time than each long post-amble and is common for base stations in one group, and wherein each long post-amble includes a subgroup identification sequence to identify one of a plurality of subgroups within one group.

40. A method as in claim 39, wherein there are four short post-ambles and two long post-ambles in the post-amble, wherein a length of each short post-amble in time is one half of a length of each long post-amble.

41. A method as in claim 39, further comprising including a cyclic prefix at a beginning portion of the post-amble in time, wherein the cyclic prefix is a copy of a last segment of a short post-amble following the cyclic prefix in time.

42. A method as in claim 39, further comprising:
placing the plurality of short post-ambles in a first OFDM symbol within the downlink subframe; and
placing the plurality of long post-ambles in a second, different OFDM symbol within the downlink subframe.

43. A method as in claim 39, further comprising:
including a first cyclic prefix at a beginning portion of the first OFDM symbol, wherein the first cyclic prefix is a copy of a last segment of a short post-amble following the first cyclic prefix in time.

44. A method as in claim 43, further comprising:
including a second cyclic prefix at a beginning portion of the second OFDM symbol, wherein the second cyclic prefix is a copy of a last segment of a long post-amble following the second cyclic prefix in time.

45. A method as in claim 39, further comprising:
dividing each short preamble into a plurality of short subsequences;
assigning, in frequency, the short subsequences to different subcarriers as different short subsequence carrier sets;
dividing each long preamble into a plurality of long subsequences;
assigning, in frequency, the long subsequences to different subcarriers as different long subsequence carrier sets; and
assigning the different short and long subsequence carrier sets to two or more different antennas in the base station for downlink transmission.

46. A method as in claim 38, wherein the cell identification sequence is placed in time at a beginning portion of the post-amble.

47. A method as in claim 17, further comprising:
including a long post-amble symbol in the downlink subframe as part of a post-amble for the downlink subframe, wherein the long post-amble symbol includes a plurality of identical sequential long post-ambles each comprising a subgroup identification sequence to identify one of a plurality of subgroups within one group;
including the one cell identification sequence as part of a preamble at the beginning of the downlink subframe; and
placing a second downlink subframe immediately ahead of the downlink subframe in time to include (1) a second preamble which includes a copy of the one cell identification sequence at the beginning of the second downlink subframe and (2) a second post-amble at the end of the second downlink subframe to include a plurality of identical sequential short post-ambles as a short post-amble symbol, wherein each short post-amble is shorter than each long post-amble and includes the one group identification sequence.

48. A method as in claim 47, wherein the short post-amble symbol includes eight identical and sequential short post-ambles and the long post-amble symbol includes four identical and sequential long post-ambles, wherein a length of each short post-amble in time is one half of a length of each long post-amble.

49. A method as in claim 47, further comprising:

dividing each short preamble into a plurality of short subsequences;

assigning, in frequency, the short subsequences to different subcarriers as different short subsequence carrier sets;

dividing each long preamble into a plurality of long subsequences;

assigning, in frequency, the long subsequences to different subcarriers as different long subsequence carrier sets; and assigning the different short and long subsequence carrier sets to two or more different antennas in the base station for downlink transmission.

50. A method as in claim 17, further comprising:

including a long post-amble symbol in the downlink subframe as part of a post-amble at the end in time of the downlink subframe, wherein the long post-amble symbol includes a plurality of identical sequential long post-ambles each comprising a subgroup identification sequence to identify one of a plurality of subgroups within one group;

including a short post-amble symbol as part of the post-amble for the downlink subframe, wherein the short post-amble symbol is equal in length in time to the long post-amble symbol and includes a plurality of identical sequential short post-ambles, wherein each short post-amble is shorter than each long post-amble and includes the one group identification sequence; and including the one cell identification sequence as part of a preamble at the beginning in time of the downlink subframe.

51. A method as in claim 50, wherein the short post-amble symbol is placed in time before the long post-amble symbol.

52. A method as in claim 50, further comprising:

dividing each short preamble into a plurality of short subsequences;

assigning, in frequency, the short subsequences to different subcarriers as different short subsequence carrier sets;

dividing each long preamble into a plurality of long subsequences;

assigning, in frequency, the long subsequences to different subcarriers as different long subsequence carrier sets; and assigning the different short and long subsequence carrier sets to two or more different antennas in the base station for downlink transmission.

53. A method as in claim 17, further comprising including a subgroup identification sequence in the downlink subframe to identify a subgroup of base stations within each group, wherein different subgroup identification sequences are respectively assigned to different subgroups of base stations.

54. A method as in claim 17, wherein the one group identification sequence is in every other L frames of sequential downlink subframes in a downlink signal, wherein L is an integer greater than 0.

* * * * *

UNITED STATES PATENT AND TRADEMARK OFFICE
CERTIFICATE OF CORRECTION

PATENT NO. : 7,496,113 B2
APPLICATION NO. : 11/205774
DATED : February 24, 2009
INVENTOR(S) : Sean Cai et al.

It is certified that error appears in the above-identified patent and that said Letters Patent is hereby corrected as shown below:

IN THE CLAIMS

Column 17, line 11 (Claim 10), after "and" insert --a--;

Column 19, line 33 (Claim 17), delete "conies" and insert --copies--.

Signed and Sealed this

Nineteenth Day of May, 2009

JOHN DOLL
*Acting Director of the United States Patent and Trademark Office*